(12) United States Patent
Mitani

(10) Patent No.: US 7,391,430 B2
(45) Date of Patent: Jun. 24, 2008

(54) IMAGE FORMING APPARATUS WITH LED HEADS STAGGERED IN SUB-SCANNING DIRECTION

(75) Inventor: Seiji Mitani, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 10/989,410

(22) Filed: Nov. 17, 2004

(65) Prior Publication Data

US 2005/0128538 A1 Jun. 16, 2005

(30) Foreign Application Priority Data

Nov. 21, 2003 (JP) ............................. 2003-391683
Aug. 27, 2004 (JP) ............................. 2004-247674

(51) Int. Cl.
  *B41J 2/435* (2006.01)
  *B41J 2/47* (2006.01)
  *H04N 1/04* (2006.01)

(52) U.S. Cl. ........................ 347/224; 347/239; 358/486
(58) Field of Classification Search ................ 358/514, 358/486; 347/224, 239
  See application file for complete search history.

(56) References Cited

U.S. PATENT DOCUMENTS 5,251,045 A * 10/1993 Sakata ........................ 358/451
5,805,738 A * 9/1998 Kaburagi et al. ............ 382/251
6,400,854 B1 6/2002 Kudoh
6,801,334 B1 * 10/2004 Enomoto .................... 358/1.18
6,894,712 B2 5/2005 Ishikawa et al. ............ 347/239
2002/0167680 A1 11/2002 Sakurai ........................ 358/1.9
2003/0030853 A1 * 2/2003 Makihira et al. ............ 358/486

FOREIGN PATENT DOCUMENTS

JP 2002-19178 1/2002
JP 2002-283609 10/2002

* cited by examiner

*Primary Examiner*—An H. Do
*Assistant Examiner*—Sarah Al Hashimi
(74) *Attorney, Agent, or Firm*—Oblon, Spivak, McClelland, Maier & Neustadt, P.C.

(57) ABSTRACT

In an image forming apparatus, a plurality of light emitting device array units for drawing image data on a photoconductor are arranged in a main scanning direction corresponding to an axial direction of the photoconductor with staggered positioning in a sub-scanning direction. The image forming apparatus includes a ratio setting unit configured to set a ratio of fine size adjustment for finely adjusting a size of the image data, a computing unit configured to compute a displacement of the image data responsive to the ratio of fine size adjustment set by the ratio setting unit, and a fine size adjustment unit configured to change intervals of occurrences of line synchronizing signals in response to the computation by the computing unit.

8 Claims, 7 Drawing Sheets

FIG.8

| [RATIO OF FINE SIZE ADJUSTMENT] % | [DELAY FOR CORRECTION OF LPH2 IN SUB-SCANNING DIRECTION AT TIME OF FINE SIZE ADJUSTMENT] |
|---|---|
| 1 | −4 |
| 0.9 | −4 |
| 0.8 | −3 |
| 0.7 | −3 |
| 0.6 | −2 |
| 0.5 | −2 |
| 0.4 | −2 |
| 0.3 | −1 |
| 0.2 | −1 |
| 0.1 | 0 |
| 0 | 0 |
| −0.1 | 0 |
| −0.2 | 1 |
| −0.3 | 1 |
| −0.4 | 2 |
| −0.5 | 2 |
| −0.6 | 2 |
| −0.7 | 3 |
| −0.8 | 3 |
| −0.9 | 4 |
| −1 | 4 |

IMAGE FORMING APPARATUS WITH LED HEADS STAGGERED IN SUB-SCANNING DIRECTION

BACKGROUND OF THE INVENTION

1. Field of the Invention

The present invention generally relates to image forming apparatuses such as copiers, facsimile machines, printers, and printing machines equipped with an LED-based drawing unit in which a plurality of units of LED (light emitting diode) arrays are arranged in the main scanning direction with staggered positioning in the sub scanning direction, and particularly relates to an image forming apparatus that can perform fine size adjustment by use of a line synchronizing signal of the main scanning direction.

2. Description of the Related Art

LED printers are provided with a drawing unit having a one-dimensional LED head, in which a plurality of LEDs (light emitting diodes) are arranged at predetermined pitches in the main scanning direction to form an array serving as a light emitting array unit. In response to image data to be drawn, the light emission of each LED of the LED head is controlled, thereby shining and focusing light on a photoconductor to draw an image. Such LED printers do not have a movable part like a polygon mirror used in laser printers, and are thus highly reliable. In the case of an extended width machine capable of producing a large size printout, with an advantage in that there is no need for optical space in which a light beam is scanned in the main scan direction as in the laser printers, the size of the machine can be reduced by providing an integrated LED head in which an LED array is integrated with optical devices such as SELFOC lens and the like. Because of this, LED printers are used in place of laser printers.

In the laser printers, one light source (laser diode) having an approximately 10-mW output is lighted to produce a light beam, which is then scanned by a polygon mirror, fθ lens, etc. In the LED printers, on the other hand, LEDs corresponding to respective pixels are arranged in the main scanning direction, and an electric current approximately ranging from a few mA to 10 mA is supplied to each LED to light it up. The control of data transfer and light emission is performed on a LED-specific basis.

As the size of printers and copiers becomes large, thus, the numbers of LEDs and driver ICs increase proportionately, resulting in a drop in the production yield and also an increase in the length of the unit. Under such circumstances, in order to maintain the precision of beam arrangement for drawing, there is a need to increase the precision of the components. This results in highly expensive unit prices for the components, compared to small-size printers and copiers.

Against this background, Patent Documents identified below disclose an apparatus in which a plurality of LED heads for use in inexpensive small-size printers or copiers are arranged in the axial direction of the photoconductor (main scanning direction), thereby providing for the maximum photoconductive width in the axial direction of the photoconductor to be exposed to light in a piecewise manner by these LED heads.

[Patent Document 1] Japanese Patent Application No. 2002-19178

[Patent Document 2] Japanese Patent Application No. 2002-283609

When arranging a plurality of LED array units in the main scanning direction with staggered positioning in the sub-scanning direction, Patent Document 1 corrects the displacement of image data caused by the staggered positioning of the LED array units in the sub-scanning direction in the units of lines, and further corrects a displacement less than one line width remaining after such correction. This provides an LED-based drawing unit capable of accurately correcting the displacement of image data in the sub-scanning direction.

When arranging a plurality of LED array units in the main scanning direction with staggered positioning in the sub-scanning direction, Patent Document 2 uses a division controlling unit to divide the image data to be transferred to the LED array units into data blocks corresponding to the respective LED array units, and uses a transfer timing controlling unit to transfer the divided image data blocks to the respective LED array units with respective time delays corresponding to the positional displacement of a focusing point in the rotational direction (travel direction) on the photoconductor. This provides an image forming apparatus capable of producing high-quality images despite the use of a plurality of LED array units and divisional exposure of the photoconductive layer of the photoconductor.

Patent Document 1 and Patent Document 2 teach correcting the displacement of image data caused by the staggered positioning of LED array units in the sub-scanning direction with reference to a case in which an image is formed without a size change by use of the apparatus with the staggered positioning of LED array units in the sub-scanning direction. These patent documents, however, are silent about the case in which an image is formed with fine size adjustment.

Conventional LED printers are provided with the function to perform fine size adjustment that enlarges or reduces the size of an image by the increments of 0.1% for the purpose of producing a large-size printout (forming an image on a long-size paper). Here, a supplemental description will be given of a process performed in the case of image formation without a size change. A plurality of LED array units are staggered as shown in FIG. 4. An image is formed without a size change by delaying image data in amount equal to the number of main scanning lines that corresponds to the distance in the sub-scanning direction between the reference LED array unit and an LED array unit of interest that is staggered relative to the reference LED array unit in the sub-scanning direction. If staggered positioning in the sub-scanning direction is equivalent to 412 main scanning lines, for example, the image data is output to an LED head 503 after waiting for 412 synchronizing signal detections since one line corresponds to one synchronizing signal. This produces an image having no displacement in the sub-scanning direction. When an image is to be formed with fine size adjustment, the interval of signal occurrence is shifted with respect to the signal (main scanning line synchronizing signal) for synchronizing with the displacement of an LED array unit in the sub-scanning direction, thereby achieving fine size adjustment by the increments of 0.1% for size enlargement or reduction. The use of such fine size adjustment for the forming of images, however, gives rise to a problem in that the shifting of the intervals of main scanning line synchronizing signals results in the displacement of image data.

Accordingly, with respect to an image forming apparatus in which a plurality of LED array units are arranged in the main scanning direction with staggered positioning in the sub-scanning direction, and in which proper image output is obtained by shifting the intervals of main scanning line synchronizing signals despite the staggered positioning of the LED array units in the sub-scanning direction, there is a need for an image forming apparatus that can obtain image data without displacement in the sub-scanning direction even in the case of image formation with fine size adjustment.

SUMMARY OF THE INVENTION

It is a general object of the present invention to provide an image forming apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image forming apparatus particularly pointed out in the specification in such full, clear, concise, and exact terms as to enable a person having ordinary skill in the art to practice the invention.

To achieve these and other advantages in accordance with the purpose of the invention, the invention provides an image forming apparatus in which a plurality of light emitting device array units for drawing image data on a photoconductor are arranged in a main scanning direction corresponding to an axial direction of the photoconductor with staggered positioning in a sub-scanning direction. The image forming apparatus includes a ratio setting unit configured to set a ratio of fine size adjustment for finely adjusting a size of the image data, a computing unit configured to compute a displacement of the image data responsive to the ratio of fine size adjustment set by the ratio setting unit, and a fine size adjustment unit configured to change intervals of occurrences of line synchronizing signals in response to the computation by the computing unit.

According to at least one embodiment of the invention, the image forming apparatus as described above further includes a correction unit configured to correct the displacement of the image data by shifting the intervals of the line synchronizing signals when the fine size adjustment unit performs fine size adjustment.

According to at least one embodiment of the invention, the computing unit computes the displacement in the sub-scanning direction in terms of a number of lines in the main scanning direction.

According to at least one embodiment of the invention, the image forming apparatus as described above further includes a register configured to store the displacement in the sub-scanning direction represented in terms of a number of lines in the main scanning direction computed by the computing unit, wherein the fine size adjustment unit changes the intervals of occurrences of the line synchronizing signals based on the displacement in the sub-scanning direction stored in the register.

According to at least one embodiment of the invention, the fine size adjustment unit increases the intervals of occurrences of the line synchronizing signals at a time of plus fine size adjustment compared to a time of normal fine size adjustment to achieve fine size enlargement, and decreases the intervals of occurrences of the line synchronizing signals at a time of minus fine size adjustment compared to a time of normal fine size adjustment to achieve fine size reduction.

According to at least one embodiment of the invention, the computing unit computes the displacement in the sub-scanning direction based on:

$$Z=((X*a)/Y)-a,$$

wherein X is a length of the line synchronizing signals at a time of normal fine size adjustment, Y being a length of the line synchronizing signals responsive to the ratio of fine size adjustment, Z being a delay for correction in the sub-scanning direction computed in response to the ratio of fine size adjustment, and a being a default delay in the sub-scanning direction.

According to at least one embodiment of the invention, the ratio setting unit configured to set the ratio of fine size adjustment by increments of 0.1%.

According to at least one embodiment of the invention, an image forming apparatus, in which a plurality of light emitting device array units for drawing image data on a photoconductor are arranged in a main scanning direction corresponding to an axial direction of the photoconductor with staggered positioning in a sub-scanning direction, includes a ratio setting unit configured to set a ratio of fine size adjustment for finely adjusting a size of the image data, a storage unit configured to store ratios of fine size adjustment and displacements of the image data corresponding to the ratios of fine size adjustment, an acquisition unit configured to acquire from the storage unit a displacement of the image data corresponding to the ratio of fine size adjustment set by the ratio setting unit, and a fine size adjustment unit configured to change intervals of occurrences of line synchronizing signals in response to the displacement of the image data acquired by the acquisition unit.

According to at least one embodiment of the invention, the ratios of fine size adjustment and the displacements of the image data corresponding to the ratios of fine size adjustment stored in the storage unit is a table including delays in the sub-scanning direction corresponding to the ratios of fine size adjustment.

According to at least one embodiment of the invention, the ratio setting unit configured to set the ratio of fine size adjustment by increments of 0.1%.

According to at least one embodiment of the invention, the displacement of the image data is acquired from the storage unit each time fine size adjustment is performed, and is added to a default delay in the sub-scanning direction for use as a corrected delay in the sub-scanning direction.

According to at least one embodiment of the invention, a method of forming an image by an image forming apparatus, in which a plurality of light emitting device array units for drawing image data on a photoconductor are arranged in a main scanning direction corresponding to an axial direction of the photoconductor with staggered positioning in a sub-scanning direction, includes a ratio setting step of setting a ratio of fine size adjustment for finely adjusting a size of the image data, a computing step of computing a displacement of the image data responsive to the ratio of fine size adjustment set by the ratio setting step, and a fine size adjustment step of changing intervals of occurrences of line synchronizing signals in response to the computation by the computing step.

According to at least one embodiment of the invention, an image forming apparatus is provided in which the intervals of occurrences of the line synchronizing signals in the main scanning direction are shifted to provide a proper image output despite the staggered positioning of the LED array units in the sub-scanning direction, and to provide image data without displacement in the sub-scanning direction even in the case of image formation with fine size adjustment.

According to at least one embodiment of the invention, further, the storage unit for storing the ratios of fine size adjustment and the displacements of image data corresponding to the ratios of fine size adjustment is provided, making it possible to produce image data without displacement in the sub-scanning direction at high speed.

BRIEF DESCRIPTION OF THE DRAWINGS

Other objects and further features of the present invention will be apparent from the following detailed description when read in conjunction with the accompanying drawings, in which:

FIG. 8 is a diagram showing a table including ratios of fine size adjustment and delays for correction in the sub-scanning direction at the time of fine size adjustment responsive to the ratios of fine size adjustment.

DESCRIPTION OF THE PREFERRED EMBODIMENTS

In the following, embodiments of the present invention will be described with reference to FIG. 1 through FIG. 9.

Figure 1:
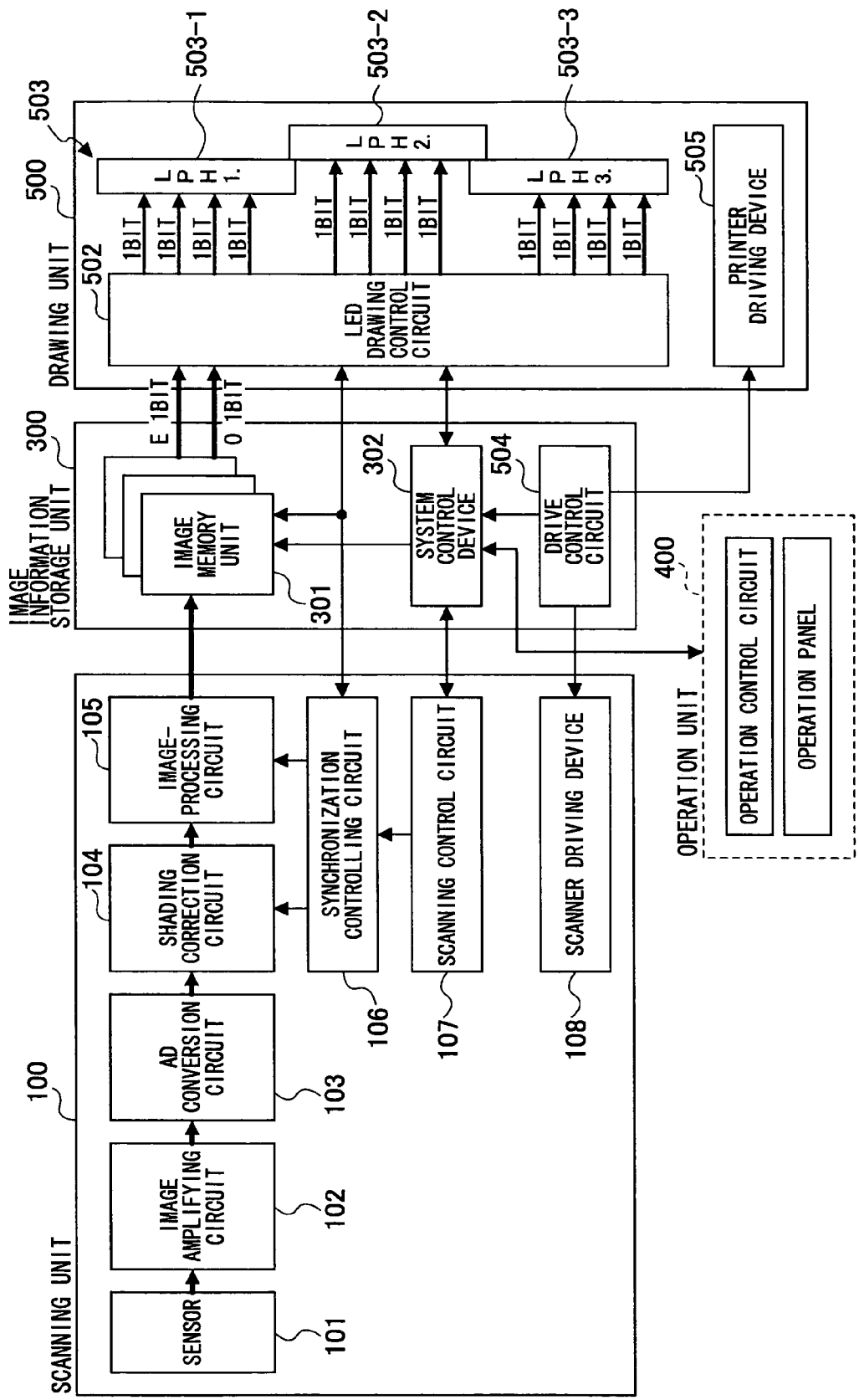
FIG. 1 is a block diagram showing the construction of a digital copier according to an embodiment of the present invention.

FIG. 1 is a block diagram showing the construction of a digital copier according to an embodiment of the present invention. With reference to FIG. 1, a description will be given of the outline of the digital copier according to the embodiment of the invention.

The digital copier includes a scanning unit 100 serving as a scanning means for scanning a document image, an image information storage unit 300 serving as a storage means for storing image information scanned by the scanning unit 100, a drawing unit 500 for copying the image information stored in the image information storage unit 300 onto a transfer paper sheet, a system control device 302 for controlling a series of processes to copy the image information stored in the image information storage unit 300 onto the transfer paper sheet, an operation unit 400 serving as an operation means for entering key-typed inputs into the system control device 302, etc.

In the following, a description will be given of the construction of the scanning unit 100.

When an operator inserts a document into the inlet of the scanning unit 100, the document is conveyed between a sensor 101 serving as a close-contact sensor and a white roller in response to the revolution of the roller. The document, while being conveyed, is irradiated by an LED attached in the sensor 101. The reflective light is focused on the sensor 101, which enables the scanning of image information provided on the document. The document image focused on the sensor 101 is converted into an analog image signal, which is then amplified by an image amplifying circuit 102. An AD (analog/digital) conversion circuit 103 converts the analog image signal amplified by the image amplifying circuit 102 into a digital image signal (digital image information), which assumes multi-values corresponding to respective pixels. The converted digital image signal is output in synchronization with a clock signal output from a synchronization controlling circuit 106. A shading correction circuit 104 then performs the correction processes to correct distortions resulting from uneven lighting, dirt on the contact glass, the uneven sensitivity of the sensor 101, etc. The digital image information after such correction is subjected to predetermined image processing by an image-processing circuit 105 for conversion into digital record image information, which is then stored in an image memory unit 301.

In what follows, a description will be given of the drawing unit 500 and the system control device 302 for controlling the series of processes to form on a transfer paper sheet the digital record image information stored in the image memory unit 301.

The system control device 302 possesses the functions to perform image data transfer between a scanning control circuit 107, a synchronization control circuit 106, the image memory unit 301, and an LED drawing control circuit 502 and to perform overall control for controlling the smooth conveyance of scanned documents and transfer sheets by driving motors and the like through a scanner driving device 108 and a printer driving device 505 by use of a drive control circuit 504. In the drawing unit 500, the LED drawing control circuit 502 converts the digital record image information on a bit-by-bit basis as it is transferred from the image memory unit 301 by a synchronizing clock signal. An LED head (LPH) 503, which is a plurality of LED array units, outputs infrared light based on the converted bits.

A flow of image data (digital record image information) from the image memory unit 301 to the drawing unit 500 will be described here. The binary image data supplied from the image memory unit 301 to the LED drawing control circuit 502 are two 16-MHz parallel lines comprised of even (E) data and odd (O) data. The image data transferred through the two lines are merged into one line in the LED drawing control circuit 502 for transfer to LED heads (LPH) 503-1, 503-2, and 503-3.

Figure 2:
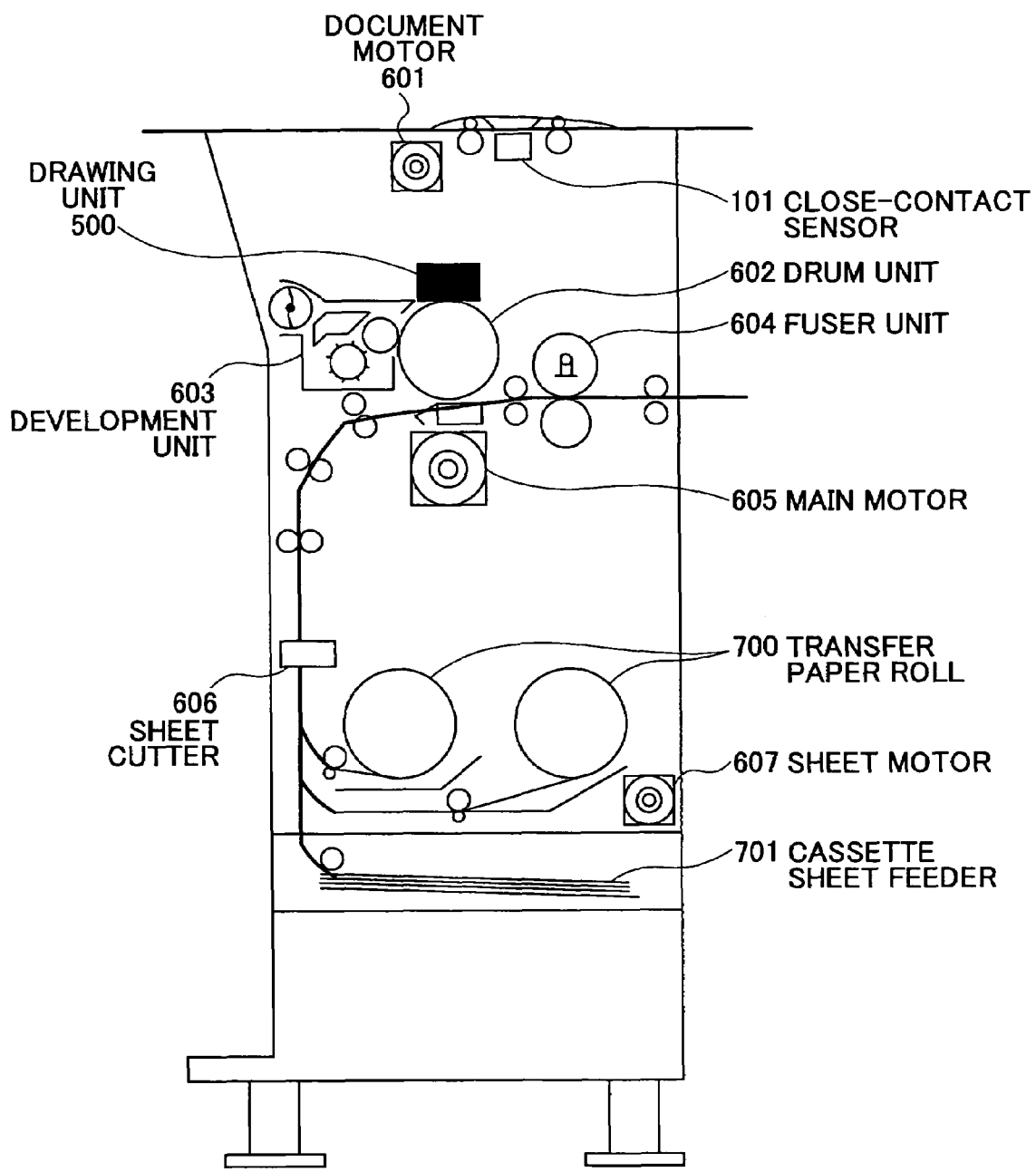
FIG. 2 is a side view of the digital copier according to the embodiment of the present invention.
Figure 3:
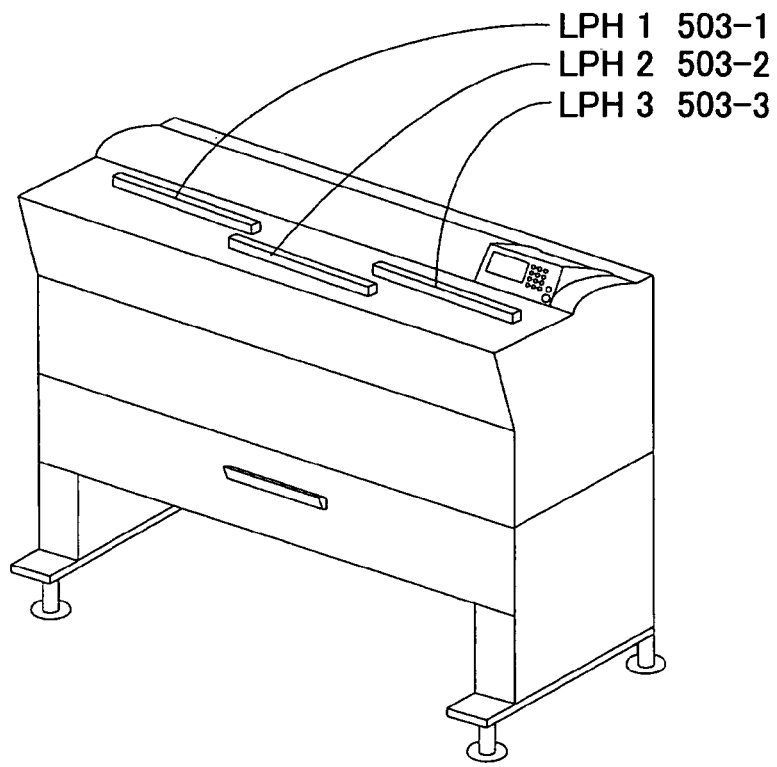
FIG. 3 is an entire view of the digital copier according to the embodiment of the present invention.
Figure 4:
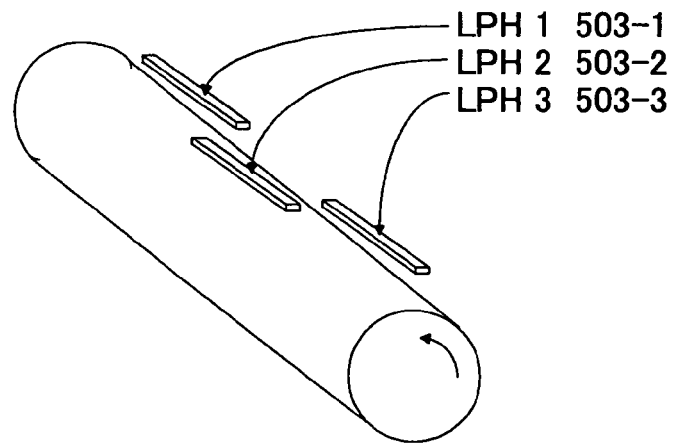
FIG. 4 is a perspective view of LED heads.

In the following, a description will be given of the arrangement of the plurality of LED head (LPH) 503 with reference to FIG. 2 through FIG. 4. FIG. 2 is a side view of the digital copier according to the embodiment of the present invention. FIG. 3 is an entire view of the digital copier according to the embodiment of the present invention. FIG. 4 is a perspective view of the LED head (LPH) 503.

With reference to FIG. 2, the digital copier includes the close-contact sensor 101, a document motor 601, a drum unit 602, the drawing unit 500, a development unit 603, a fuser unit 604, a main motor 605, a sheet cutter 606, and a sheet motor 607. The document motor 601 provides the drive to convey a document. The drum unit 602 includes a photoconductive drum on which an electrostatic latent image is formed. The development unit 603 develops the latent image into a toner image. The fuser 604 fuses the toner image transferred onto a transfer sheet to provide a permanent fix. The main motor 605 provides the drive to rotate the photoconductive drum as well as to convey the transfer sheet. The sheet cutter 606 cuts a roll 700 of transfer paper into separate transfer sheets. The sheet motor 607 provides the drive to convey transfer sheets from the roll 700 of transfer paper or from a cassette sheet feeder 701.

The drawing unit 500 includes the LED head 503 comprised of a plurality of the LED heads 503-1 through 503-3. With reference to FIG. 3, the LPH1 503-1, the LPH2 503-2, and the LPH3 503-3, serving as the LED head (LPH) 503, are provided in staggered arrangement. As shown in FIG. 4, this staggered arrangement is such that the LPH1 503-1, the LPH2 503-2, and the LPH3 503-3 are arranged in the axial direction (main scanning direction) of the photoconductive drum of the drum unit 602 shown in FIG. 2 with staggered positioning in the sub-scanning direction.

In the following, a description will be given of the timing at which image data is supplied to the LED head 503 in the digital copier according to the embodiment of the present invention. As was described above, a plurality of LED heads (LPH) are arranged in the axial direction (main scanning direction) of the photoconductive drum with staggered positioning in the sub-scanning direction in the digital copier according to the embodiment of the present invention. The displacements of the LED heads (LPH) in the sub-scanning direction are converted into the numbers of main scanning lines before the image is fed into the LED heads, which is then stored in the registers of the system control device 302. The image data stored in the line memory of the LED drawing control circuit 502 is supplied to the LED head 503 in accordance with the converted line numbers.

If staggered positioning in the sub-scanning direction is equivalent to 412 main scanning lines, for example, the image data is output to the LED head 503 after waiting for 412 synchronizing signal detections since one line corresponds to one synchronizing signal. This produces an electrostatic latent image on the photoconductive drum according to the image data having no displacement in the sub-scanning direction.

Figure 5:
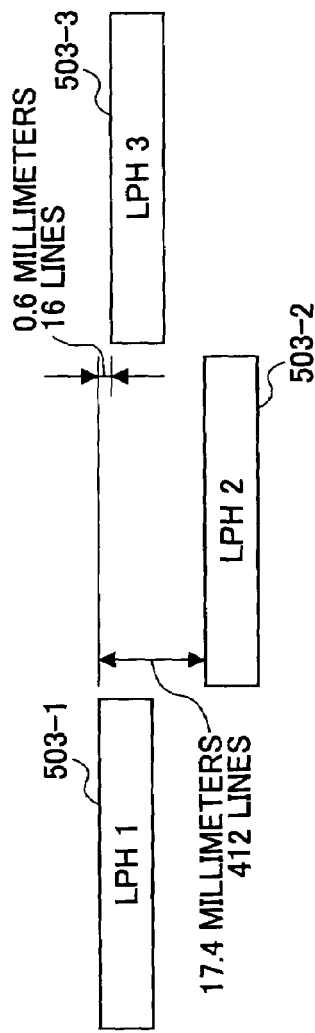
FIG. 5 is an illustrative drawing for explaining the timing at which image data is output to the LED heads.

In the following, a description will be given of the timing at which image data is output to the LED head (LPH) 503 by using specific numeric examples. With reference to FIG. 5, the LPH2 503-2 at the center is positioned 17.4 mm downstream relative to the LPH1 503-1. The LPH3 503-3 on the right is positioned 0.6 mm downstream relative to the LPH1 503-1. If the timing at which image data is supplied to the LPH1 503-1 is used as a reference, the image data for the LPH2 503-2 needs to be delayed by 412 lines before provision to the LED head, and the image data for the LPH3 503-3 needs to be delayed by 16 lines before provision to the LED head. The amount of delay in the sub-scanning direction (the number of delayed lines) varies, depending on the displacement of the LED head of interest in the sub-scanning diction and image resolution. Even if a displacement in the sub-scanning direction stays the same at 17.4 mm, the amount of delay in the sub-scanning direction varies, depending on whether drawing is performed with 600 dpi or performed with 400 dpi. Throughout the following description of this embodiment, the specific number of lines (412 lines) used in the above example will be used consistently.

In the following, a description will be given of a process performed when an image is formed with fine size adjustment. The digital copier according to the embodiment of the invention is equipped with the function to form an image with fine size adjustment like conventional LED printers. The function of fine size adjustment is different from zoom size changes that are ordinarily made by the increments of 1%, and is the size change that provides a fine size adjustment to an output image after image formation for the purpose of giving a high quality finish to the image formation. Users can set the ratio of fine size adjustment by the increments of 0.1% by operating buttons separate from those for zoom size changes on the operation unit 400. If enlargement/reduction less than 1% is necessary with respect to an image after image formation, fine size adjustment is employed. If enlargement/reduction more than 1% is necessary, the scanning of the document is repeated again to use the zoom size change.

Figure 6A:
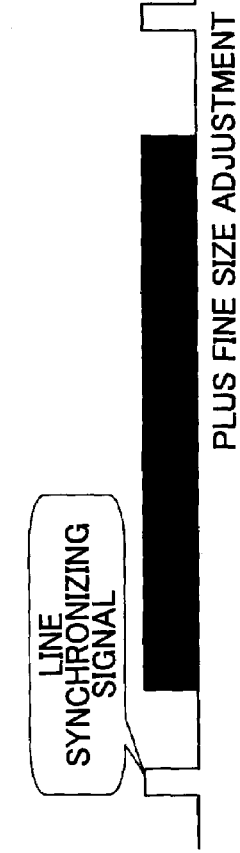
FIGS. 6A through 6C are illustrative drawings showing the intervals of main scanning line synchronizing signals for plus fine size adjustment, for normal fine size adjustment, and for minus fine size adjustment, respectively.

If the user sets a ratio of fine size adjustment for the digital copier to form an image with fine size adjustment, the intervals of occurrences of main scanning line synchronizing signals are adjusted longer or shorter than a normal length. This achieves the control of fine size adjustment for size enlargement/reduction. Namely, as shown in FIG. 6A, the intervals of occurrences of main scanning line synchronizing signals are lengthened in the case of plus fine size adjustment, compared to the case of normal fine size adjustment, thereby achieving fine size enlargement. As shown in FIG. 6C, the intervals of occurrences of main scanning line synchronizing signals are shortened in the case of minus fine size adjustment, compared to the case of normal fine size adjustment, thereby achieving fine size reduction. In the case of normal fine size adjustment shown in FIG. 6B, neither fine size enlargement nor fine size reduction is performed. That is, a normal zoom size change is used to form an image without any particular setting for fine size adjustment.

Figure 6B:
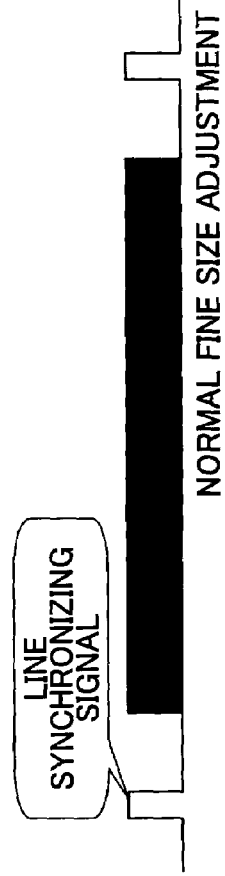
Figure 6C:
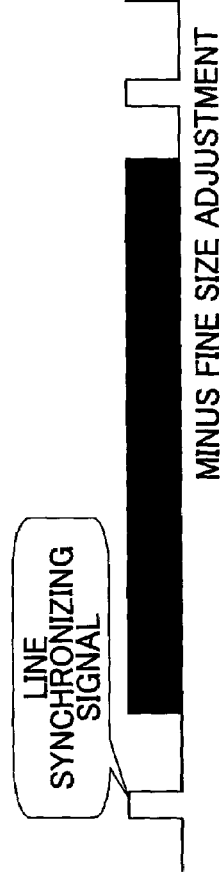

FIGS. 6A through 6C are illustrative drawings showing the intervals of main scanning line synchronizing signals for plus fine size adjustment, for normal fine size adjustment, and for minus fine size adjustment, respectively.

The displacement of image data becomes conspicuous when the displacement o the LED head (LPH) 503 in the sub-scanning direction is large and when the linear velocity of the photoconductive drum (i.e., the speed of image formation) is slow. This is because, as the displacement of the LED head (LPH) 503 in the sub-scanning direction increases, and as the linear velocity of the photoconductive drum decreases, the delay with respect to the outputting of image data from the line memory increases. For example, an increase in the linear velocity of the drum causes the shortening of intervals of synchronizing signals. This results in the early outputting of an image, i.e., results in a less conspicuous displacement in the sub-scanning direction. For example, a linear velocity three times as fast results in one third of a displacement in the sub-scanning direction.

Figure 7:
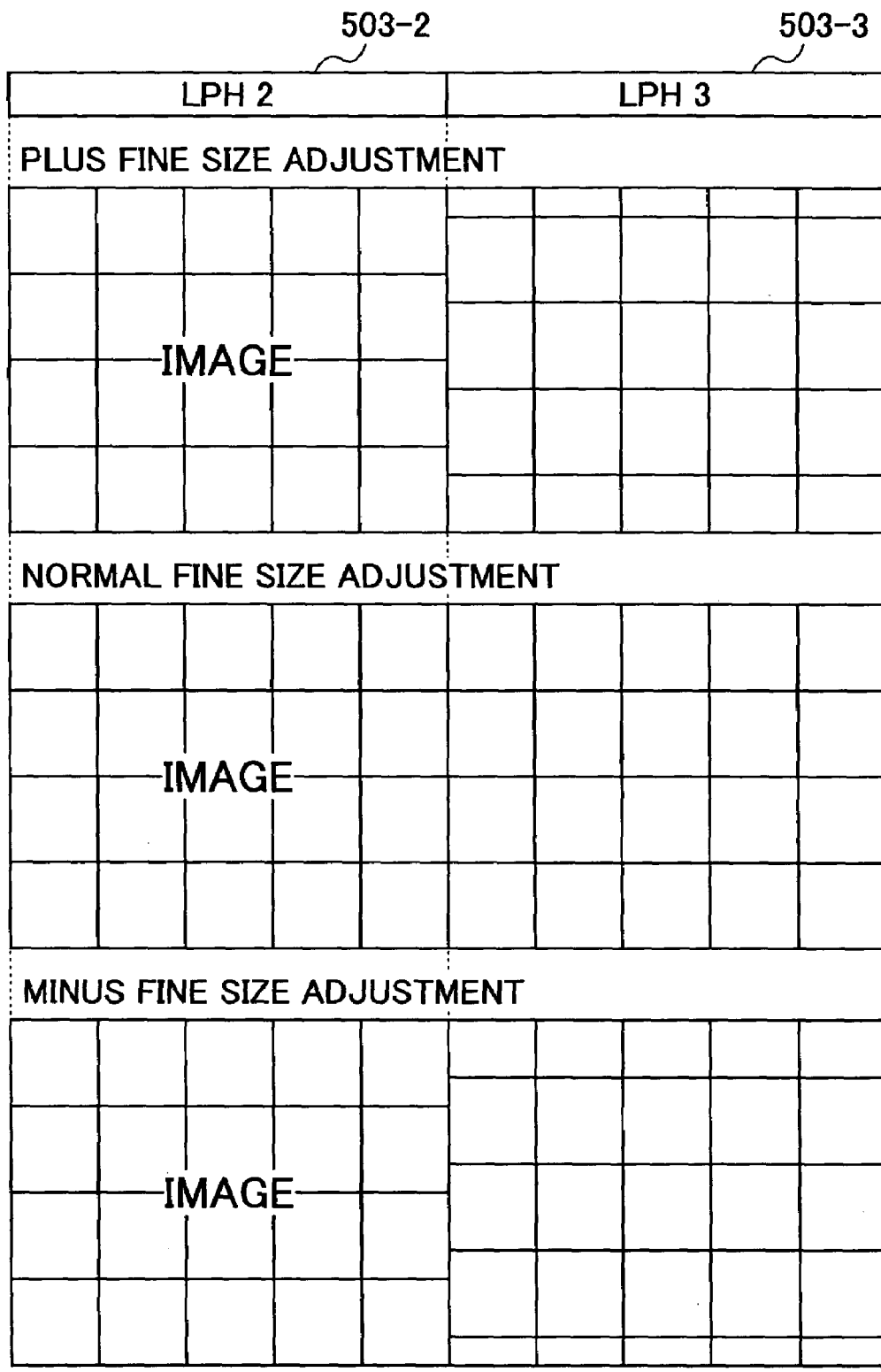
FIG. 7 is an illustrative drawing showing a displacement of image data output from the LED heads at the time of plus fine size adjustment and at the time of minus fine size adjustment.

FIG. 7 is an illustrative drawing showing a displacement of image data output from the LED head (LPH) 503 at the time of plus fine size adjustment and at the time of minus fine size adjustment. In FIG. 7, image data output from the LPH2 503-2 and the LPH3 503-3 is taken as an example to illustrate the displacement of image data.

The digital copier according to the embodiment of the present invention supplies an image to the LED head after converting the displacement in the sub-scanning direction into the number of lines in the main scanning direction in response to the ratio of fine size adjustment at the time of plus fine size adjustment or at the time of minus fine size adjustment. With this provision, the displacement of an image is corrected. In the following, a description will be given of a method of correcting an image displacement when an image is formed with fine size adjustment.

First, a method of computing a delay in the sub-scanning direction at the time of fine size adjustment will be described by use of a mathematical expression with reference to the delay in the sub-scanning direction of the LPH1 503-1 and the LPH2 503-2.

$$Z = ((X * a)/Y) - a$$

X: the length of a main scanning line synchronizing signal lsync at the time of normal fine size adjustment (705.6 us);

Y: the length of the main scanning line synchronizing signal lsync responsive to the ratio of fine size adjustment (705.6 us * the ratio of fine size adjustment);

Z: delay for correction in the sub-scanning direction computed in response to the ratio of fine size adjustment; and a: the default delay of LPH2 in the sub-scanning direction (fixed value 412 (i.e., a difference in terms of lines between LPH1 and LPH2)).

The value of Z may be rounded to the nearest integer.

The digital copier according to the embodiment of the present invention computes Z by using the above expression, thereby obtaining the delay of the LPH2 responsive to the ratio of fine size adjustment in the sub-scanning direction. The delay of the LPH2 in the sub-scanning direction at the time of fine size adjustment (i.e., Z computed in response to the ratio of fine size adjustment) is added to the default delay (412 lines) of the LPH2 in the sub-scanning direction, which is set as a corrected delay in the sub-scanning direction. As previously described, with the outputting of image data to the LPH1 serving as a reference, the image data for the LPH2 is output to the LED head 503 when the main scanning line synchronizing signals equal in amount to the corrected delay in the sub-scanning direction are output. This can correct the displacement of an image in the sub-scanning direction caused by fine size adjustment.

In the description provided above, the delay for correction of the LPH2 in the sub-scanning direction at the time of fine size adjustment is computed by use of the expression each time an image is formed with fine size adjustment. Alternatively, the delays of the LPH2 in the sub-scanning direction at the time of fine size adjustment may be computed in advance by use of the expression, and may be stored as a table in the system control device 302 or the like of the digital copier.

FIG. 8 is a diagram showing a table including the ratios of fine size adjustment and the delays for correction of the LPH2 in the sub-scanning direction at the time of fine size adjustment responsive to the ratios of fine size adjustment. Such table is stored in the digital copier. When the delays for correction of the LPH2 in the sub-scanning direction at the time of fine size adjustment are stored as a table in this manner, a delay for correction is retrieved from the table each time an image is formed with fine size adjustment. The retrieved delay for correction of the LPH2 in the sub-scanning direction at the time of fine size adjustment is added to the default delay (412 lines) of the LPH2 in the sub-scanning direction, which is then set as a corrected delay in the sub-scanning direction. With such a table storing the correction values in the sub-scanning direction responsive to the ratios of fine size adjustment, it is possible to change the delay in the sub-scanning direction in response to the ratio of fine size adjustment, thereby correcting the displacement of an image in the sub-scanning direction caused by fine size adjustment. Compared to a case in which the delay for correction in the sub-scanning direction is obtained from the mathematical formula as described above, the provision of data in a table format achieves faster processing speed.

Figure 9:
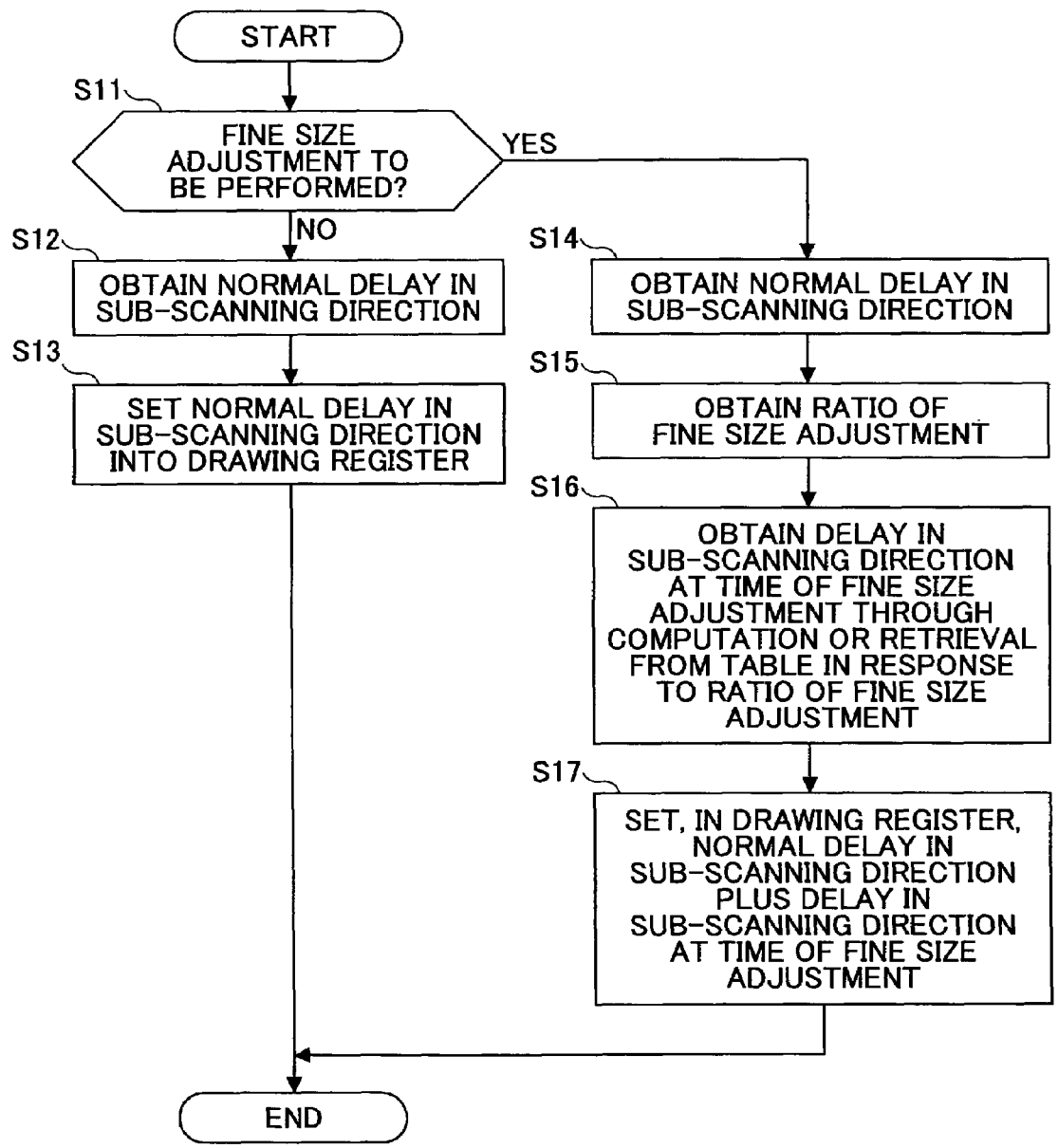
FIG. 9 is a flowchart showing a procedure for setting delays in the sub-scanning direction in the register of a system control device.

FIG. 9 is a flowchart showing a procedure for setting delays in the sub-scanning direction in the register of the system control device 302. With reference to FIG. 9, the digital copier first determines whether to perform fine size adjustment (step S11). Whether to perform fine size adjustment is determined according to whether the user selects a ratio of fine size adjustment on the operation unit 400.

If fine size adjustment is not to be performed (i.e., the user did not select a ratio of fine size adjustment) (N at step S11), the default delay in the sub-scanning direction is obtained (step S12). In the case of the LPH2, for example, the default delay in the sub-scanning direction is 412 lines, which is a difference in terms of lines between the LPH1 and the LPH2. The default delay in the sub-scanning direction is set in the register of the system control device 302 or the like provided in the digital copier (step S13).

If fine size adjustment is to be performed (i.e., the user has selected a ratio of fine size adjustment) (Y at step S11), the default delay in the sub-scanning direction is obtained (step S14). In the case of the LPH2, for example, the default delay in the sub-scanning direction is 412 lines as described above. The ratio of fine size adjustment selected by the user on the operation unit 400 is obtained (step S15). Further, the delay for correction in the sub-scanning direction at the time of fine size adjustment is obtained in response to the ratio of fine size adjustment obtained at step S15 (step S16). At step S16, the delay for correction in the sub-scanning direction at the time of fine size adjustment may be computed from the mathematical formula as previously described, or may be obtained from the table as described above. The sum of the default delay in the sub-scanning direction obtained at step S14 and the delay for correction in the sub-scanning direction at the time of fine size adjustment obtained at step S16 is stored in the drawing register (step S17).

Further, the present invention is not limited to these embodiments, but various variations and modifications may be made without departing from the scope of the present invention.

The present application is based on Japanese priority application No. 2004-247674 filed on Aug. 27, 2004, with the Japanese Patent Office, the entire contents of which are hereby incorporated by reference.

What is claimed is:

1. An image forming apparatus including a first light emitting device array unit and a second light emitting device array unit for drawing image data on a photoconductor, the first light emitting device array unit and the second light emitting device array unit being arranged in a main scanning direction corresponding to an axial direction of the photoconductor and being staggered in position in a sub-scanning direction, comprising:

a ratio setting unit configured to set a ratio of fine size adjustment for finely adjusting a size of the image data;

a computing unit configured to compute a displacement of the image data responsive to the ratio of fine size adjustment set by said ratio setting unit such that the displacement in the sub-scanning direction is obtained in terms of a number of lines in the main scanning direction; and a fine size adjustment unit configured to change intervals of occurrences of line synchronizing signals in response to the ratio of fine size adjustment set by said ratio setting unit, wherein the image data is supplied to the first light emitting device array unit and the second light emitting device array unit at respective timings, a difference of the respective timings corresponds to the displacement of the image data computed by the computing unit.

2. The image forming apparatus as claimed in claim 1, wherein said fine size adjustment unit increases the intervals of occurrences of the line synchronizing signals at a time of plus fine size adjustment compared to a time of normal fine size adjustment to achieve fine size enlargement, and decreases the intervals of occurrences of the line synchronizing signals at a time of minus fine size adjustment compared to a time of normal fine size adjustment to achieve fine size reduction.

3. The image forming apparatus as claimed in claim 1, wherein said computing unit computes the displacement in the sub-scanning direction based on:

$$Z=((X*a)/Y)-a,$$

wherein X is a length of the line synchronizing signals at a time of normal fine size adjustment, Y being a length of the line synchronizing signals responsive to the ratio of fine size adjustment, Z being a delay for correction in the sub-scanning direction computed in response to the ratio of fine size adjustment, and a being a default delay in the sub-scanning direction.

4. The image forming apparatus as claimed in claim 1 wherein said ratio setting unit configured to set the ratio of fine size adjustment by increments of 0.1%.

5. An image forming apparatus including a first light emitting device array unit and a second light emitting device array unit for drawing image data on a photoconductor, the first light emitting device array unit and the second light emitting device array unit being arranged in a main scanning direction corresponding to an axial direction of the photoconductor and being staggered in position in a sub-scanning direction, comprising:
- a ratio setting unit configured to set a ratio of fine size adjustment for finely adjusting a size of the image data;
- a storage unit configured to store ratios of fine size adjustment and displacements of the image data corresponding to the ratios of fine size adjustment such that the ratios of fine size adjustment and the displacements of the image data corresponding to the ratios of fine size adjustment stored in said storage unit is a table including delays in the sub-scanning direction corresponding to the ratios of fine size adjustment;
- an acquisition unit configured to acquire from said storage unit a displacement of the image data corresponding to the ratio of fine size adjustment set by said ratio setting unit; and
- a fine size adjustment unit configured to change intervals of occurrences of line synchronizing signals in response to the ratio of fine size adjustment set by said ratio setting unit,
- wherein the image data is supplied to the first light emitting device array unit and the second light emitting device array unit at respective timings, a difference of the respective timings corresponds to the displacement of the image data computed by the computing unit.

6. The image forming apparatus as claimed in claim 5, wherein said ratio setting unit configured to set the ratio of fine size adjustment by increments of 0.1%.

7. The image forming apparatus as claimed in claim 5, wherein the displacement of the image data is acquired from said storage unit each time fine size adjustment is performed, and is added to a default delay in the sub-scanning direction for use as a corrected delay in the sub-scanning direction.

8. A method of forming an image by an image forming apparatus including a first light emitting device array unit and a second light emitting device array unit for drawing image data on a photoconductor, the first light emitting device array unit and the second light emitting device array unit being arranged in a main scanning direction corresponding to an axial direction of the photoconductor and being staggered in position in a sub-scanning direction, comprising:
- a ratio setting step of setting a ratio of fine size adjustment for finely adjusting a size of the image data;
- a computing step of computing a displacement of the image data responsive to the ratio of fine size adjustment set by said ratio setting step such that the displacement in the sub-scanning direction is obtained in terms of a number of lines in the main scanning direction;
- a fine size adjustment step of changing intervals of occurrences of line synchronizing signals in response to the ratio of fine size adjustment set by said ratio setting step; and
- a step of supplying the image data to the first light emitting device array unit and the second light emitting device array unit at respective timings, wherein a difference of the respective timings corresponds to the displacement of the image data computed by the computing unit.

* * * * *